United States Patent
Bristiel et al.

(10) Patent No.: US 11,143,326 B2
(45) Date of Patent: Oct. 12, 2021

(54) FLUID FLOW CONTROL VALVE EQUIPPED WITH AN ELECTRIC ACTUATOR AND SYSTEM INCLUDING SUCH A VALVE

(71) Applicant: LIEBHERR-AEROSPACE TOULOUSE SAS, Toulouse (FR)

(72) Inventors: Frédéric Bristiel, Toulouse (FR); Raphaël Vilamot, Toulouse (FR); Eric Lafond, Toulouse (FR); Stéphane Fauque, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 169 days.

(21) Appl. No.: 16/666,406

(22) Filed: Oct. 29, 2019

(65) Prior Publication Data
US 2021/0123539 A1 Apr. 29, 2021

(30) Foreign Application Priority Data
Oct. 29, 2018 (FR) ........................................ 1859982

(51) Int. Cl.
| | | |
|---|---|---|
| *F16K 5/04* | (2006.01) | |
| *F16K 31/06* | (2006.01) | |
| *B64D 13/06* | (2006.01) | |
| *B61D 27/00* | (2006.01) | |
| *F16K 31/04* | (2006.01) | |

(52) U.S. Cl.
CPC ........ *F16K 31/0668* (2013.01); *B61D 27/009* (2013.01); *B64D 13/06* (2013.01); *F16K 5/0421* (2013.01); *F16K 5/0442* (2013.01); *F16K 31/041* (2013.01); *B64D 2013/0625* (2013.01)

(58) Field of Classification Search
CPC .. F16K 31/0668; F16K 5/0442; F16K 31/041; F16K 5/0421; B64D 13/06; B64D 2013/0625; B61D 27/009; Y10T 137/86743
USPC .......... 251/129.22, 129.11–129.13, 205–209, 251/304; 137/625.31
See application file for complete search history.

(56) References Cited

U.S. PATENT DOCUMENTS

| | | | | |
|---|---|---|---|---|
| 2,319,347 | A | * 5/1943 | Reed | ..................... F15B 21/125 137/625.24 |
| 3,127,909 | A | 4/1964 | Alamprese | |
| 4,526,199 | A | * 7/1985 | Heitmann | ............. F16K 47/045 137/625.31 |
| 4,785,624 | A | * 11/1988 | Smith | ..................... F02C 9/18 137/625.31 |
| 4,789,132 | A | 12/1988 | Fujita | |

(Continued)

*Primary Examiner* — John Bastianelli
(74) *Attorney, Agent, or Firm* — Steven M. Greenberg, Esq.; Shutts & Bowen LLP (57) ABSTRACT

A fluid flow control valve includes a valve body, a closing member arranged in the valve body and configured so that it can have at least one first position, called the open position, in which it allows the flow of fluid to flow freely in the valve body, and at least one second position, called the closed position, in which it prevents the fluid flow from flowing in the valve body between the fluid inlet and the fluid outlet, an electric actuator of the closing member that is suitable for being able to control the position of the closing member in the valve body, characterized in that the electric actuator is arranged in the valve body so that it can be cooled by the flow of fluid flowing in the valve body.

11 Claims, 3 Drawing Sheets

(56) References Cited

U.S. PATENT DOCUMENTS

| | | | | |
|---|---|---|---|---|
| 5,544,856 | A | * | 8/1996 | King .................... F16K 31/0655 |
| | | | | 251/129.08 |
| 7,699,289 | B2 | * | 4/2010 | Peeters .................... F16K 5/12 |
| | | | | 251/129.11 |
| 8,757,205 | B1 | * | 6/2014 | Trent .................... F16K 47/045 |
| | | | | 137/601.16 |
| 2008/0224075 | A1 | | 9/2008 | Emin |
| 2015/0069279 | A1 | | 3/2015 | Larsen et al. |
| 2015/0276075 | A1 | | 10/2015 | Davies |
| 2017/0167624 | A1 | | 6/2017 | Harck et al. |

* cited by examiner

FLUID FLOW CONTROL VALVE EQUIPPED WITH AN ELECTRIC ACTUATOR AND SYSTEM INCLUDING SUCH A VALVE

CROSS REFERENCE TO RELATED APPLICATIONS

This application claims priority under 35 U.S.C. § 119(a) to French patent application number 1859982, filed on Oct. 29, 2018, the entire teachings of which are incorporated herein by reference.

BACKGROUND OF THE INVENTION

Field of the Invention

The present invention relates to a valve for controlling a fluid flow, in particular an air flow, and more particularly to a fluid flow control valve arranged in an engine environment of an aircraft and an air-conditioning system that includes such a valve, and yet further to a ventilation system that includes such a valve.

Description of the Related Art

An air-conditioning system for an aircraft cabin generally includes a device for collecting compressed bleed air on at least one compressor of an aircraft propulsion engine and an air-cycle turbine engine including at least one compressor and a turbine, the compressor being supplied with air by the compressed bleed air device after passing through a flow or pressure control valve, and the turbine including an air outlet supplying the cabin at a controlled temperature and flow rate. The air-conditioning system also includes various heat exchangers, control valves and a water extraction loop.

An air control valve enables the flow of air flowing in the air flow duct equipped with this control valve to be controlled.

Such a control valve can be arranged in the engine environment, i.e. in the engine nacelle or in the immediate vicinity of the engine, on the bleed air pipes.

Such a control valve is also used in the air ventilation systems of aircraft engines, which are housed in the engine nacelle.

The arrangement of these control valves in an engine environment means they must be combined with valve actuators that can withstand the high temperatures prevailing in this engine environment.

It is also necessary to use a valve with a small overall size so that it can be arranged in this engine environment.

To meet these two constraints, one of the solutions currently implemented is to use a valve controlled by a hydraulic actuator, the control fluid of which is the fuel. This fuel hydraulic actuator controls the opening and closing of the valve. For example, the actuator is equipped with a displacement transducer, such as a displacement transducer known by the acronym LVDT (linear variable differential transformer). This LVDT transducer detects the passage of the control fluid, in this case the fuel, and determines the opening or closing of the valve.

The valve is thus actuated by the pressure of the fuel on the hydraulic actuator, which causes the displacement of the member for closing the valve, such as a butterfly valve.

When the valve is housed in the engine environment, the hydraulic actuator, also housed in the engine environment, is subjected to high temperatures that can reach almost 500° C. during an aircraft flight. The hydraulic actuator is cooled by the fuel controlling the actuator.

The use of fuel as a muscle fluid to control the hydraulic actuator can have drawbacks, especially in an engine environment. This is because the fuel system must be dimensioned so that the fuel pressure controls the hydraulic actuator. Furthermore, the use of a fuel system to control the actuators increases the consumption of the fuel pump system and may also result in the risk of fuel leakage. In addition, the use of a fuel actuator generates integration constraints that can be complex and/or expensive to take into account.

Furthermore, in an engine environment, the assembly formed by the valve and its hydraulic actuator has a significant overall size and weight, which can have an impact on the energy performance of the aircraft.

An alternative solution could be to use electric actuators. However, it is known that, given the high temperatures prevailing in this environment, such actuators cannot be used in an engine environment unless complex systems for cooling the electric actuators are provided.

BRIEF SUMMARY OF THE INVENTION

The inventors have therefore sought to develop a new solution to control the valves for controlling fluid, in particular air, that are suitable for engine environments.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

The aim of the invention is to provide a valve for controlling a fluid flow, in particular an air flow, which can be arranged in an aircraft engine environment and which overcomes at least some of the disadvantages of the known solutions.

The invention aims in particular to provide a valve equipped with an electric actuator that is compatible with the heat stresses of an aircraft engine environment.

The invention also aims to provide, in at least one embodiment, a valve which has a smaller overall size compared to the valves in the previous solutions.

The invention also aims to provide an air-conditioning system equipped with a control valve according to the invention.

The invention also aims to provide a ventilation system equipped with a control valve according to the invention.

The invention also aims to provide a vehicle for air or rail transport equipped with an air-conditioning system or a ventilation system according to the invention.

DISCLOSURE OF THE INVENTION

To this end, the invention relates, in its broadest sense, to a fluid flow control valve including:

a valve body including a fluid inlet, a fluid outlet, and a fluid flow duct which extends in a direction, called the longitudinal direction, between the fluid inlet and the fluid outlet, a closing member arranged in the fluid flow duct and configured so as to be able to have at least one first position, called the open position, in which it allows the fluid flow to flow freely in the flow duct, and at least one second position, called the closed position, in which it prevents, at least partially, the flow of fluid in the flow duct between the fluid inlet and the fluid outlet, an electric actuator of the closing member that is suitable for being able to control the position of the closing member in the fluid flow duct.

A valve according to the invention is characterized in that the electric actuator is arranged at least partially in the fluid flow duct such that it can be cooled by the fluid flowing between the fluid inlet and the fluid outlet of the valve body and in that the closing member includes two conjugate concentric elements: a fixed element with respect to the valve body and a rotary element with respect to the fixed element, which rotary element is called the valve core and is controlled by the electric actuator.

A valve according to the invention therefore has the specific feature of using an electric actuator and of integrating this actuator, at least partially, in the fluid flow duct of the valve body such that this electric actuator can be cooled by the flow of fluid flowing in the flow duct of the valve. This electric actuator can also be combined with a reduction gear to drive the closing member. If necessary, the reduction gear is also housed in the fluid flow duct.

In other words, a valve according to the invention enables both a fluid flow to be controlled (by actuation of the closing member) and the actuator of this closing member to be cooled (by the flow of fluid flowing in the flow duct in which the actuator is housed).

A valve according to the invention makes it possible to dispense with a dedicated ventilation system for the electric actuator. This elimination of a dedicated ventilation system thus makes it possible to eliminate bleed air for cooling the actuator and thus maximize the effective air flow in the system in which the valve is integrated.

This fluid flow is controlled by the presence of a closing member that can have at least one first position, called the open position, which allows a fluid to flow from the inlet to the fluid outlet of the valve body, and at least one second position, called the closed position, in which the closing member prevents, at least partially, the flow of a fluid in the valve body.

In the position called the open position, the fluid flow rate through the closing member is maximal. In the position called the closed position, the fluid flow rate through the closing member is minimal.

In one embodiment of the invention, the closing member prevents any fluid flow when in the closed position. According to this embodiment, the closing member extends across the flow duct to block the passage of fluid when in the closed position. In other words, the minimum fluid flow rate corresponds to a zero flow rate.

In another embodiment, the closing member only blocks part of the flow when in the closed position. This embodiment makes it possible, for example, to maintain a fluid leak when the closing member is in the closed position.

According to the invention, the closing member includes two conjugate concentric elements: a fixed element relative to the valve body and a rotary element relative to the fixed element, which rotary element is called the valve core.

The electric actuator allows the closing member to be displaced and thus the fluid flow rate to be controlled. This actuator can itself be controlled by a control unit configured to set the position of the closing member in the fluid flow duct.

According to the invention, the electric actuator rotates the valve core, via a reduction gear, relative to the fixed element, enabling the closing member to have at least one open position allowing the passage of fluid and at least one closed position at least partially limiting the passage of fluid.

In all of the following, the rotary element is designated by the term 'valve core' or by the term 'liner'.

In addition, the actuator controls the open and closed positions of the closing member and the fluid circulating in the fluid duct cools the actuator.

The electric actuator thus makes it possible to coordinate the two conjugate concentric elements in order to control the circulation of fluid.

In one embodiment of the invention, the closing member can also be controlled by the electric actuator to assume at least one position, called the intermediate position, in which the fluid cross-sectional area is intermediate between the minimum cross-sectional area corresponding to the closed position and the maximum cross-sectional area corresponding to the open position of the valve.

The valve according to the invention, which integrates the electric actuator in the fluid flow duct, has a small overall size. A valve according to the invention is therefore especially suitable for small spaces and environments subjected to severe temperature conditions.

Advantageously and according to the invention, the fluid flow duct has at least one axis of symmetry extending along the longitudinal direction and the electric actuator is arranged on this axis of symmetry.

According to this advantageous embodiment, the electric actuator is arranged in the center of the flow duct, i.e. on the longitudinal axis of symmetry of the flow duct. This specific arrangement makes it possible to limit the vibrations of the assembly formed by the valve and the actuator. For example, the duct can be a rotationally symmetrical duct and the actuator is arranged on this axis of rotational symmetry.

This specific arrangement also makes it possible to insulate the electric actuator from the engine environment by forming an air cushion between the electric actuator and the external engine environment, including when the flow duct is not supplied with air. This air cushion limits the thermal conduction between the electric actuator and the engine environment.

Advantageously and according to the invention, the electric actuator is arranged upstream of the closing member.

According to this embodiment, the actuator is arranged upstream of the closing member, such that the fluid can cool the actuator before passing through the closing member when it is in the open position that allows the passage of fluid.

This embodiment also allows the actuator to be cooled even when the closing member is in the closed position which limits the flow from the fluid inlet to the fluid outlet of the valve.

Alternatively or in combination, the closing member may include at least one longitudinal axis opening which is configured to allow the formation of a fluid leak through the closing member. This ensures that the electric actuator is cooled, regardless of the arrangement of the actuator relative to the closing member.

Advantageously and according to the invention, the valve core of the closing member delimits a central duct which includes a sealed transverse wall.

According to this embodiment, the sealed transverse wall extends perpendicularly to the longitudinal direction so as to impede the flow in the longitudinal direction downstream of this wall and thus to improve the seal.

For example, the sealed transverse wall may be formed by the actuator and more particularly by the housing protecting the actuator, or any element closing the central duct at one end in order to impede the flow of fluid and also ensure the seal.

According to an advantageous embodiment, the conjugate concentric elements forming the closing member are cylindrical.

According to this embodiment, the concentric elements are cylindrical, in the mathematical sense of the term, i.e. they take the form of a solid generated by a straight line that moves parallel to itself on a generatrix. This generatrix can be a circle, an oval, a square and generally any closed curve.

According to an advantageous embodiment, the conjugate concentric cylindrical elements have a circular base. According to this embodiment, the closing member thus includes two conjugate concentric cylindrical elements, one of which, called the internal element, has a first diameter, and the other, called the external element, has a second diameter which is larger than the first diameter of the internal cylindrical element.

The internal cylindrical element may be fixed or rotary relative to the external cylindrical element, which is respectively rotary or fixed.

Preferably, the internal cylindrical element is rotary relative to the external cylindrical element which is fixed.

Advantageously and according to the invention, the conjugate concentric elements each include a wall provided with at least one fluid passage aperture arranged such that the fluid flow is constrained to flow through the apertures when the electric actuator controls the rotation of the rotary element such that the apertures in the conjugate elements are opposite each other and correspond to the open position of the closing member, and that the flow is constrained when the electric actuator controls the rotation of the rotary element such that the fluid passage apertures in the conjugate elements are respectively opposite the wall of the conjugate cylindrical element, and correspond to the closed position of the closing member.

According to this embodiment, the conjugate concentric elements include fluid passage apertures so that they can control the flow rate of fluid flowing in the flow duct.

The dimension and shape of the apertures is such that, for a specified rotational angle of the valve core, the fluid flow is completely closed or completely open. All the intermediate positions allow the flow rate of fluid within the fluid flow duct to be controlled.

Arranging the respective apertures of the fixed element and the valve core opposite each other enables a radial cross-sectional area to be released, through which the fluid can flow freely.

When the fluid passage apertures are arranged opposite the walls of the respective conjugate concentric elements, the radial fluid flow is blocked or limited, which prevents or limits the passage of fluid in the fluid flow duct.

When the passage apertures are partially arranged opposite each other, partial radial cross-sectional areas are formed, thereby enabling the air flow rate between the fluid inlet and the fluid outlet to be controlled. These positions correspond to the intermediate positions of the closing member.

The coordinated control of the opening and closing of the closing member and consequently arranging the passage apertures in the conjugate concentric cylindrical elements opposite each other make it possible to control the passage of fluid in the flow duct and therefore the flow rate.

Advantageously and according to the invention, each concentric element includes an odd number of fluid passage apertures evenly distributed on its wall.

An odd number of fluid passage apertures allows the distribution of stresses to be improved and the antagonistic stresses exerted by the fluid flow on the conjugate concentric elements to be limited, in particular when the concentric elements are cylindrical.

According to this embodiment, the conjugate concentric elements have a plurality of passage apertures, which, when they are arranged opposite each another, allow the passage of the fluid.

The passage apertures are preferably evenly distributed on each wall of the conjugate concentric elements in order to allow a homogeneous passage of fluid in the flow duct.

According to this embodiment, the passage apertures of the conjugate concentric elements are arranged in a uniform and identical manner on the two conjugate concentric elements.

There can be any number of air passage apertures. For example, there is nothing to prevent the provision of conjugate concentric elements provided with a single aperture or N apertures, where N is any predetermined integer, preferably greater than or equal to 3, for example 6 or 7.

Advantageously and according to the invention, the flow of fluid circulating in the valve body is an air flow.

According to this embodiment, the air flow flows in the valve body and more particularly in the flow duct in which the actuator is housed. The air flow thus allows heat to be dissipated from the actuator.

The invention also relates to an air-conditioning system for an aircraft cabin including at least one air control valve according to the invention.

The advantages of a control valve according to the invention apply mutatis mutandis to an air-conditioning system according to the invention.

The invention also relates to an aircraft including at least one propulsion engine, a cabin and at least one air-conditioning system for the cabin, characterized in that the air conditioning system for the cabin is the air-conditioning system according to the invention.

The advantages of an air-conditioning system according to the invention apply mutatis mutandis to an aircraft according to the invention.

The invention also relates to an aircraft, characterized in that the air control valve of the air-conditioning system for the cabin is housed in the engine environment of at least one propulsion engine for the aircraft.

According to this embodiment, the valve is arranged in an engine environment. The actuator arranged in the valve body is cooled by the air flow and can thus be used in this environment that has severe temperature conditions.

In other words, the flow of air flowing around the electric actuator in the valve flow duct makes it possible to maintain the temperature thereof in an operating zone compatible with its operating range and insulates it from the ambient temperature of the engine environment, which is greater than that which can be tolerated by the electric actuator.

Furthermore, the valve according to this embodiment has a small overall size, which frees up space in the engine environment, compared to the solutions of the prior art.

The invention also relates to a valve, an air-conditioning system and an aircraft, characterized by all or some of the features mentioned above or below.

BRIEF DESCRIPTION OF THE SEVERAL
VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

For the sake of illustration and clarity, the scales and proportions are not strictly adhered to in the figures. Throughout the following detailed description with reference to the figures, unless otherwise indicated, each valve element is described as it is arranged when the electric actuator of the valve is arranged in the valve body and in particular when the actuator is arranged upstream of the closing element. This configuration is shown in particular in FIG. 1.

The terms "longitudinal" and "radial" are used with reference to the longitudinal direction, defined by the direction of the fluid flow duct extending between a fluid inlet and a fluid outlet of the valve body.

In addition, identical, similar or analogous elements are denoted using the same reference signs in all the figures.

In all of the following, the control valve described is a valve for an air-conditioning system in an aircraft. However, in other embodiments, the valve may be a control valve for a fluid other than air and may be provided in other systems than air-conditioning systems.

Figure 1:
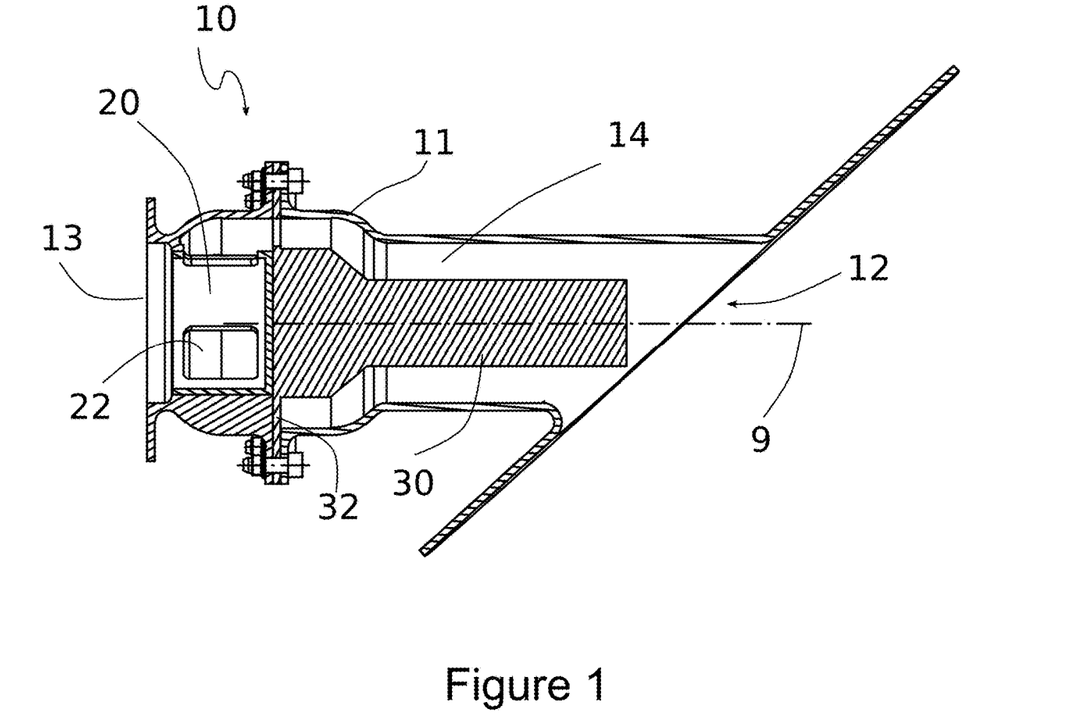
FIG. 1 is a schematic cross-sectional view of a valve according to one embodiment of the invention.

As shown in FIG. 1, a valve 10 according to the invention includes a valve body including a housing 11, an air inlet 12, an air outlet 13, an air flow duct 14 which extends between the air inlet and the air outlet in a longitudinal direction 9, a closing member 20 housed in the air flow duct and an electric actuator 30 of the closing member that is arranged in the flow duct 14.

As illustrated in FIG. 1, the electric actuator 30 extends in the longitudinal direction 9 and is integrally arranged in the air flow duct 14.

The electric actuator 30 can be of any type. For example, it is formed of an electric step motor or DC motor and a reduction gear with epicyclic gear train or other.

For example, this actuator 30 is attached to the housing 11 of the valve by fixing lugs 32 which extend radially between the actuator and the valve housing.

According to the embodiment in the figures, this actuator 30 is integrally housed in the air flow duct, i.e. it is housed between the air inlet 12 and the air outlet 13.

According to other embodiments of the invention, not shown in the figures, the actuator is only partially housed in the fluid flow duct. Where appropriate, it extends at least partly inside a duct which is connected to the valve body and intended to supply air to a piece of equipment in the air-conditioning system or supplying the valve with bleed air.

According to the embodiment in the figures, the actuator 30 is arranged upstream of the closing member 20, i.e. between the air inlet and the closing member. This particular arrangement allows the actuator to be cooled by the air supplying the valve, including when the closing member 20 is in the closed position.

A control unit, not shown in the figures, allows the actuator 30, and therefore the position of the closing member, to be controlled. This control unit can be of any type and is for example the control unit of the air-conditioning system.

Figure 2:
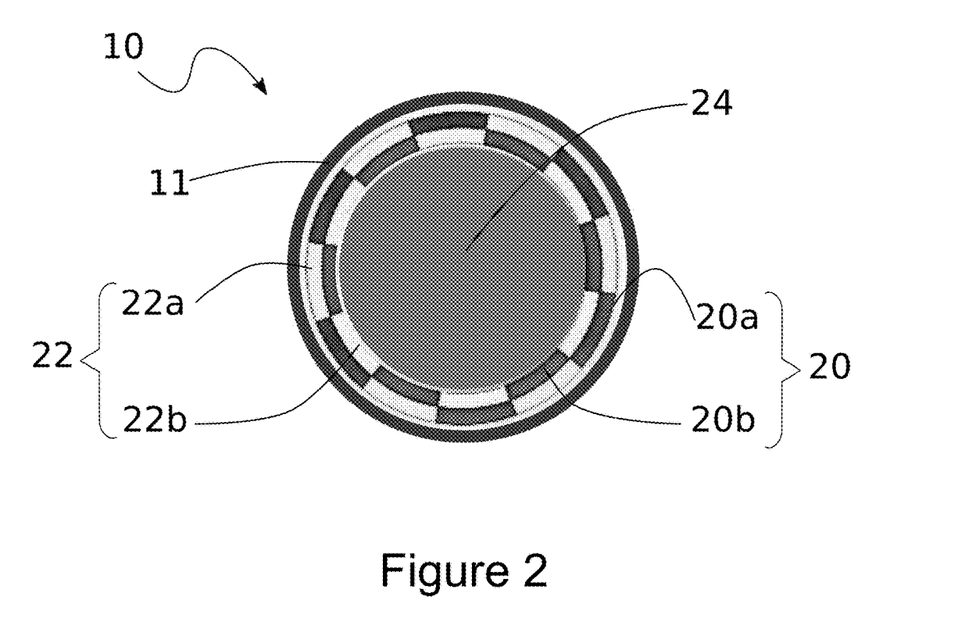
FIG. 2 is a schematic cross-sectional view of a valve according to one embodiment of the invention, illustrating the closing member in the closed position.
Figure 3:
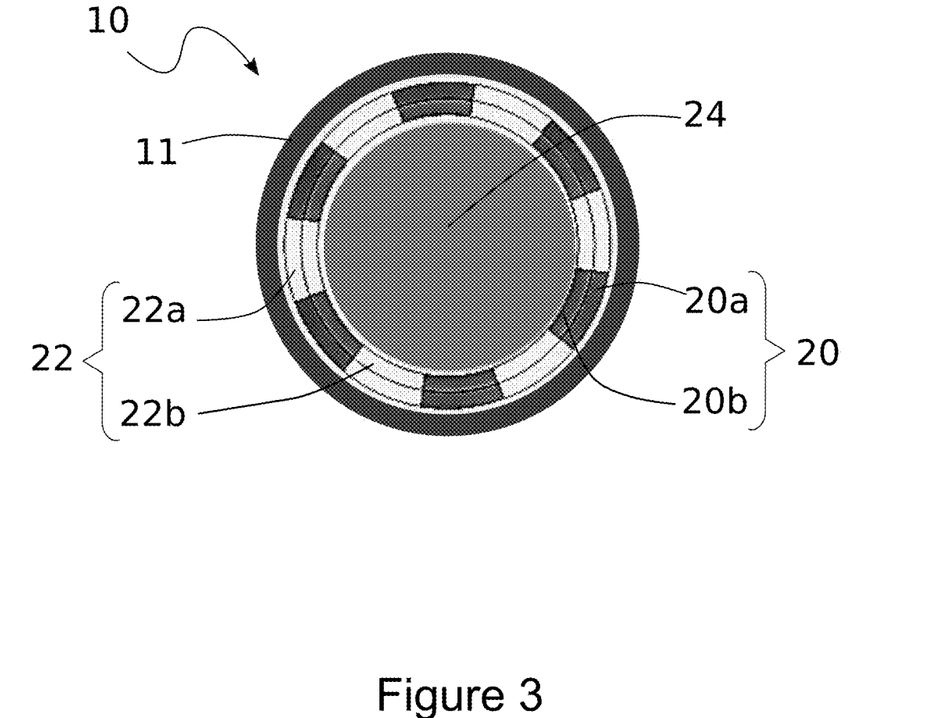
FIG. 3 is a schematic cross-sectional view of a valve according to one embodiment of the invention, illustrating the closing member in the open position.
Figure 4:
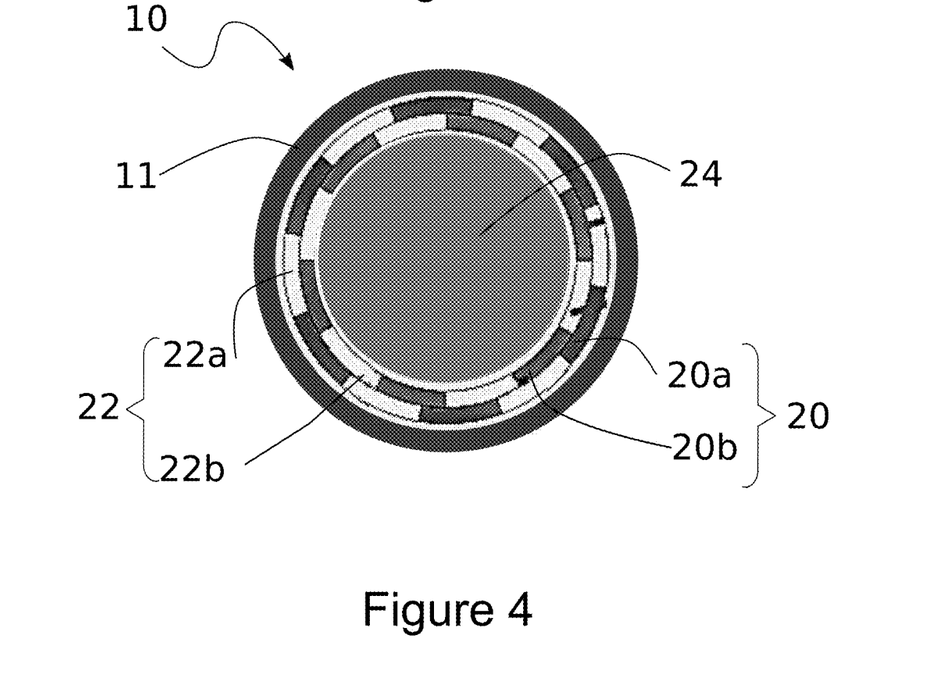
FIG. 4 is a schematic cross-sectional view of a valve according to one embodiment of the invention, illustrating the closing member in an intermediate position between the open position and the closed position.

As illustrated in FIGS. 2 to 4, the closing member 20 consists, according to a preferred embodiment, of two conjugate concentric cylindrical elements: a fixed cylindrical element 20a relative to the valve housing and a cylindrical valve core which forms a rotary cylindrical element 20b relative to the fixed cylindrical element.

Each cylindrical element 20a, 20b includes a wall 21a, 21b in which the air passage apertures 22a, 22b are provided. The air passage apertures 22a, 22b can be of any type. They form radial cross-sections for the passage of air, which make it possible to establish fluid communication between the fluid inlet and the fluid outlet of the valve when they are arranged opposite each other by rotation of the valve core relative to the fixed element.

Figures 5, 6:
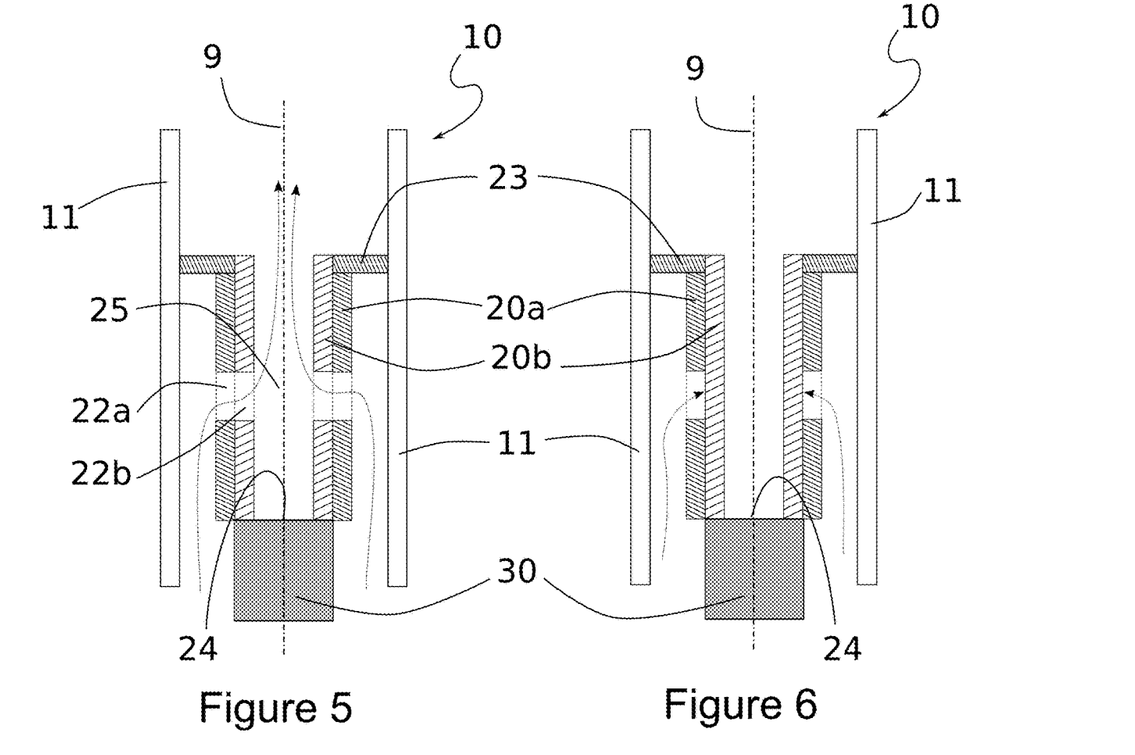
FIG. 5 is a schematic longitudinal cross-sectional view of a valve body according to one embodiment of the invention, illustrating the closing member in the open position.
FIG. 6 is a schematic longitudinal cross-sectional view of the valve body in FIG. 5 according to one embodiment of the invention, illustrating the closing member in the closed position.

FIGS. 5 and 6 schematically illustrate the operating principle of a closing member of a valve according to one embodiment of the invention. The closing member includes conjugate concentric cylindrical elements 20a, 20b which extend along the longitudinal direction 9.

These conjugate concentric closing members 20a, 20b are hollow. The cylindrical valve core 20b delimits a hollow central duct 25 into which the air can enter. The central duct 25 includes a sealed central wall 24 which extends perpendicularly to the longitudinal direction and thus hinders the flow of air along the longitudinal direction downstream of this wall. This sealed central wall 24 may be formed, as shown in FIGS. 1, 5 and 6, by the housing of the actuator 30, which blocks the central duct 25 at one end. According to other embodiments of the invention, the sealed central wall 24 is a longitudinal end wall of the valve core.

In addition, the valve body includes a housing 11 of the valve body. This valve body housing is connected to the external fixed cylindrical element 20a so as to form an annular ring 23 preventing the passage of air along the longitudinal direction 9.

The annular ring 23 and the sealed central wall 24 are each arranged at one end on either side of the closing member 20. Consequently, they make it possible to constrain the fluid to pass through the closing member 20 through the air passage apertures 22 when the closing member is placed in the open position.

The air flows in a duct delimited by the housing of the actuator 30 and by the valve body housing 11 before reaching the closing member 20 and radially passing through the cylindrical elements through the air apertures 22a, 22b.

In FIG. 5, the closing member is in the open position and the air is passing through the air passage apertures. This air flow through the air passages is schematically represented by the dashed arrows.

In FIG. 6, the closing member is in the closed position and the air is blocked from upstream to downstream of the closing member by the combined rotation of the valve core 20b, the annular wall 23 and the central wall 24. This impeded air flow is schematically represented by the dashed arrows.

FIG. 2 shows the closing member 20 in a closed position in which the two conjugate concentric cylindrical elements 20a, 20b prevent the air flow. In the closed position, the respective passage apertures 22a, 22b of the conjugate concentric cylindrical elements 20a, 20b are arranged such that the fluid passage apertures of the conjugate cylindrical elements are respectively opposite the wall of the conjugate cylindrical element, which prevents the air from radially passing through the closing member 20.

According to other embodiments, the closed position of the closing member corresponds to a position in which the flow rate is minimal. In addition, a duct for air leakage through the closing member may be provided in some applications such that the closed position does not prevent all air flow through the valve flow duct, but enables it to have a minimum air flow.

FIG. 3 illustrates the closing member in the open position according to one embodiment of the invention. The passage apertures 22a of the fixed cylindrical element 20a are arranged opposite the passage apertures 22b of the valve core 20b such that the air flow can radially pass through the cylindrical elements through the air passages 22.

The air can therefore pass through the air passage apertures 22a, 22b when they are arranged opposite each other.

Intermediate positions may also be obtained by pivoting the valve core relative to the fixed cylindrical element such that only a portion of the air passage apertures are opposite each other. An intermediate position is shown schematically in FIG. 4.

The intermediate positions correspond to the different positions that the closing member 20 can adopt to move from the open position to the closed position and vice versa.

When the closing member is in an intermediate position, the passage apertures 22a of the fixed cylindrical element 20a partially overlap the passage apertures 22b of the valve core 20b. These intermediate positions enable the air flow rate to be varied and to be adapted to the needs of the system equipped with the valve according to the invention.

In the figures, the air passage apertures of the valve core and the fixed cylindrical element have identical dimensions and/or shapes.

According to another embodiment not shown in the figures, the respective air passage apertures 22a, 22b of the fixed cylindrical element 20a and the valve core 20b have distinct geometric shapes and/or dimensions. For example, the passage apertures 22a of the fixed cylindrical element may be circular and have a smaller diameter than the passage apertures 22b of the valve core.

Figure 7:
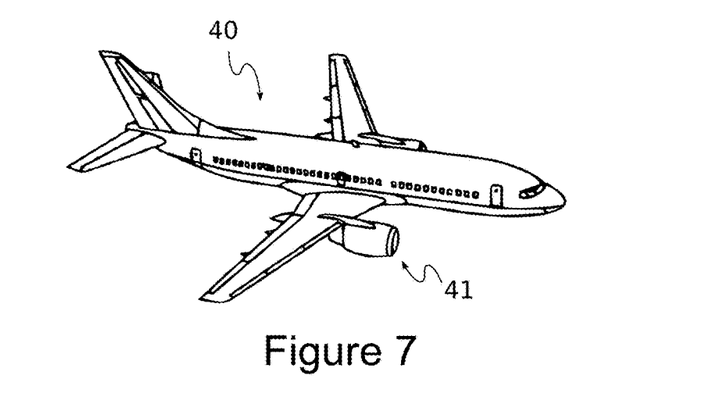
FIG. 7 is a schematic view of an aircraft according to one embodiment of the invention.

As illustrated in FIG. 7, a valve according to the invention is especially intended to equip an air-conditioning system for an aircraft cabin.

A valve according to the invention can also equip a ventilation system for a propulsion engine of an aircraft or any transport vehicle, especially an air or rail transport vehicle.

A valve according to the invention is especially intended to be housed in the engine environment of a propulsion engine 41 of an aircraft 40.

Of note, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", and/or "including," when used in this specification, specify the presence of stated features, integers, steps, operations, elements, and/or components, but do not preclude the presence or addition of one or more other features, integers, steps, operations, elements, components, and/or groups thereof.

As well, the corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

1. A fluid flow control comprising:
   a valve body comprising a fluid inlet, a fluid outlet, and a fluid flow duct extending in a longitudinal direction between the fluid inlet and the fluid outlet,
   a closing member arranged in said fluid flow duct and configured so as to be able to have an open position, in which it allows the fluid flow to flow freely in said flow duct, and a closed position, in which it prevents, at least partially, the flow of fluid in said flow duct between said fluid inlet and said fluid outlet,
   an electric actuator of said closing member that is suitable for being able to control the position of said closing member in said fluid flow duct,
   characterized in that said electric actuator is arranged at least partially in said fluid flow duct such that it can be cooled by said fluid flowing between the fluid inlet and the fluid outlet of said valve body and in that said closing member comprises two conjugate concentric elements:
   a fixed element relative to said valve body and
   a valve core comprising a rotary element relative to said fixed element and which is controlled by said electric actuator.

2. The valve according to claim 1, wherein said conjugate concentric elements each comprises a wall provided with at least one fluid passage aperture arranged such that the flow of fluid is constrained to flow through said apertures when said electric actuator controls the rotation of said rotary element such that said apertures in the conjugate elements are opposite each other and correspond to said open position of said closing member, and that said flow is blocked or constrained when said electric actuator controls the rotation of said rotary element such that the fluid passage apertures in the conjugate elements are respectively opposite the wall of the conjugate element, and correspond to said closed position of said closing member.

3. The valve according to claim 1, wherein each concentric element comprises an odd number of fluid passage apertures evenly distributed on its wall.

4. The valve according to claim 1, wherein said conjugate concentric elements forming said closing member are cylindrical.

5. The valve according to claim 1, wherein said valve core of said closing member defines a central duct comprising a sealed transverse wall.

6. The valve according to claim 1, wherein said fluid flow duct has at least one axis of symmetry extending along the longitudinal direction and said electric actuator is arranged on this at least one axis of symmetry.

7. The valve according to claim 1, wherein said electric actuator is arranged upstream of the closing member.

8. The valve according to claim 1, wherein said flow of fluid flowing in said valve body is an air flow.

9. A ventilation system for an aircraft engine comprising:
one or more air control valves, each of said valves comprising:
a valve body comprising a fluid inlet, a fluid outlet, and a fluid flow duct extending in a longitudinal direction between the fluid inlet and the fluid outlet,
a closing member arranged in said fluid flow duct and configured so as to be able to have an open position, in which it allows the fluid flow to flow freely in said flow duct, and a closed position, in which it prevents, at least partially, the flow of fluid in said flow duct between said fluid inlet and said fluid outlet,
an electric actuator of said closing member that is suitable for being able to control the position of said closing member in said fluid flow duct,
characterized in that said electric actuator is arranged at least partially in said fluid flow duct such that it can be cooled by said fluid flowing between the fluid inlet and the fluid outlet of said valve body and in that said closing member comprises two conjugate concentric elements:
a fixed element relative to said valve body and
a valve core comprising a rotary element relative to said fixed element and which is controlled by said electric actuator.

10. An air or rail transport vehicle comprising:
at least one propulsion engine,
a cabin and
at least one air-conditioning system for said cabin, wherein the air-conditioning system for the cabin is the air-conditioning system comprising at least one valve, said valve comprising a valve body comprising:
a fluid inlet, a fluid outlet, and a fluid flow duct extending in a longitudinal direction between the fluid inlet and the fluid outlet,
a closing member arranged in said fluid flow duct and configured so as to be able to have an open position, in which it allows the fluid flow to flow freely in said flow duct, and a closed position, in which it prevents, at least partially, the flow of fluid in said flow duct between said fluid inlet and said fluid outlet,
an electric actuator of said closing member that is suitable for being able to control the position of said closing member in said fluid flow duct,
characterized in that said electric actuator is arranged at least partially in said fluid flow duct such that it can be cooled by said fluid flowing between the fluid inlet and the fluid outlet of said valve body and in that said closing member comprises two conjugate concentric elements:
a fixed element relative to said valve body and
a valve core comprising a rotary element relative to said fixed element and which is controlled by said electric actuator.

11. The vehicle of claim 10, wherein said air control valve of said cabin air-conditioning system is housed in the engine environment of said at least one propulsion engine of said vehicle.

* * * * *